Jan. 27, 1970  B. KLIMEK  3,492,052

FRONT AXLE VALVE

Filed Oct. 28, 1968

INVENTOR.
Boleslaw Klimek
BY Parker, Carter & Markey
Attorneys.

United States Patent Office 3,492,052
Patented Jan. 27, 1970

3,492,052
FRONT AXLE VALVE
Boleslaw Klimek, Des Plaines, Ill., assignor to Berg Mfg. & Sales Co., Des Plaines, Ill., a corporation of Illinois
Filed Oct. 28, 1968, Ser. No. 771,183
Int. Cl. B60t 15/36
U.S. Cl. 303—6                                    5 Claims

ABSTRACT OF THE DISCLOSURE

A valve assembly for varying brake pressures applied to front vehicle wheels, including a differential piston and a second piston effective against said differential piston.

SUMMARY OF THE INVENTION

A front axle valve in which a differential piston carries a valve member to control a passage therethrough, said differential piston is yieldingly urged toward passage-open position, and a second piston of greater area is movable against said differential in response to inlet pressure at a predetermined level, whereby full inlet pressure is delivered through said valve up to a predetermined level of inlet pressure, thereafter lesser portions of said inlet pressure are delivered as said inlet pressure increases and thereafter increasing portions of said inlet pressure are delivered as said inlet pressure increases until full inlet pressure is again delivered through said valve, the operation thus described being automatic.

This invention relates to vehicle fluid pressure brake systems and particularly to an automatic control valve effective to provide predetermined varying brake pressures within such system.

One purpose of the invention is to provide an automatic valve effective to apply system pressure to front axle brakes at initial, lower brake system pressures, to apply lesser and then greater portions of system pressure as such system pressure increases and thereafter to apply full system pressure to said front axle brakes.

Another purpose of the invention is to provide an automatic reducing valve effective to supply varying pressures in response to increases in pressure delivered to said valve.

Another purpose is to provide a valve assembly automatically effective to transmit full inlet pressure therethrough at a first predetermined level of inlet pressure, to transmit a decreasing ratio of outlet pressure to inlet pressure at further predetermined levels, to transmit an increasing such ratio in response to further predetermined levels and to transmit all of said inlet pressure at still further predetermined inlet pressure levels.

Other purposes will appear from time to time during the course of the specification and claims.

BRIEF DESCRIPTION OF THE DRAWINGS

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
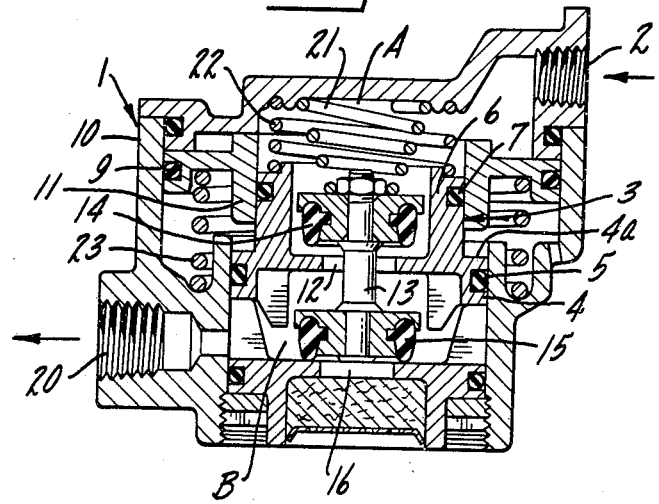
FIGURE 1 is a side view in cross section.

Referring now to the drawings, numeral 1 generally designates a housing. A fluid pressure inlet 2 communicates with a first chamber A in which the smaller diameter of a differential piston 3 is reciprocal. The piston 3 has a larger diameter portion 4 carrying a seal 5 in sealing engagement with the walls of a second chamber B beneath piston 3.

Above the portion 4, as the parts are shown, the piston 3 includes a reduced circumferential portion 6 carrying a seal 7 in sealing engagement with an inner circumferential wall portion of a larger piston 8. Piston 8 carries at its largest circumference a seal 9 in sealing engagement with the inner wall surface of an enlarged housing portion 10. The axial sleeve 11 carried by piston 8 and in which seal 7 and piston portion 6 are reciprocal is positioned for engagement with the upper annular surface 4a of the portion 4 of piston 3.

An axial passage 12 is formed in piston 3 and a double-headed valve member 13 extends therethrough. The member 13 carries a first valve head 14 positioned to close passage 12 and a second valve head 15 positioned to close an exhaust passage 16 formed in housing 1 for communication with chamber B.

Housing outlet 20 communicates with chamber B. A spring 21 engages the upper surface of housing 1 and the valve head 14 to urge head 14 toward closing position on passage 12 and head 15 toward closing position on exhaust outlet 16. A second spring 22 engages an upper portion of housing 1 and the reduced portion 6 of differential piston 3 to urge the piston 3 downwardly as the parts are shown in the drawings, or toward a position opening passage 12. A third spring 23 engages an intermediate portion of housing 1 and the undersurface of larger piston 8 to urge the same upwardly as the parts are shown in the drawings or toward inlet 2.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:
Brake system pressure is delivered substantially simultaneously to the rear brake operating cylinders (not shown) of the vehicle and to pressure inlet 2 of housing 1. The parts are, at this point, in the position illustrated in FIGURE 1. Thus valve head 15 is in closing position on exhaust outlet 16 and held thereagainst by the action of spring 21. Differential piston 3 is at its lowermost position into which it is urged by spring 22, a limiting series of vanes or abutments, indicated for example at 24, being provided for bottoming of piston 3 as shown in FIGURE 1. With the differential piston 3 in the position shown, valve head 14 is off its seat and intermediate passage 12 is thus open. At this point, also, piston 8 is held against a suitable abutment such as that shown at 25 within housing 1 by the action of spring 23.

Thus inlet pressure initially delivered upon actuation of a brake system application valve is delivered directly from inlet 2 through chamber A, passage 12, chamber B and outlet 20 to the brake actuating cylinders of the front wheels of the vehicle. Hence, initial application of brake pressure at lower predetermined pressure levels, i.e. upon application of relatively reduced braking pressure, the full inlet pressure delivered at inlet 2 is provided to the front axle brake cylinders. This result is illustrated, for example, in FIGURE 2 wherein the straight line, inclusive of a dotted central portion, represents the system or inlet pressure and the solid diverted line represents the pressure delivered at outlet 20. It will thus be noted that at initial pressures rising from zero to a predetermined level, which may for example occur as indicated at I, the inlet and outlet pressures of the valve of the invention are equal.

Thus is precluded an undesirable reduction or diminution of pressure delivered to front wheel brakes in the initial stages of such pressure delivery and in the delivery of relatively low braking pressures to the system. At a predetermined point, such as that indicated at I, for example, it is no longer desirable to supply the same braking pressures to both the front and the rear vehicle wheels. The valve of the invention is automatically effective at said point to provide a reduction in the pressure delivered at outlet 20 in relation to that delivered to the rear brakes and to inlet 2. When fluid pressure is delivered at inlet 2, the same is supplied through passage 12 to chamber B. When a predetermined level of pressure is reached in chamber B, the same produces an upward movement of differential piston 3, the pressure in chamber B being active against the larger undersurface of portion 4 exposed to chamber B. The level, such as that indicated at I, is related to the force or strength of spring 22. As differential piston 3 moves upwardly toward valve head 14, as the parts are shown, passage 12 is diminished and decreasing levels of inlet pressure are delivered through outlet 20.

Figure 2:
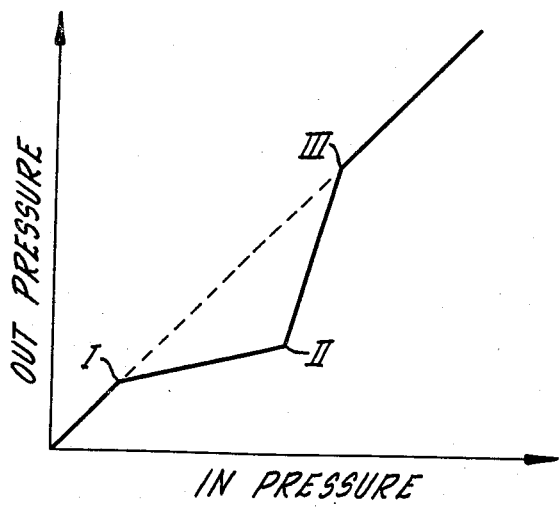
FIGURE 2 is a diagram illustrating the action of the device of the invention.

When a second predetermined level of system or inlet pressure is reached, the same is effective against the larger annular upper surface, as the parts are shown, of large piston 8 to urge the same against the action of stronger spring 23 and thus to move piston 8 downwardly, as the parts are shown. Downward movement of piston 8, through the mediacy of elongated axial sleeve 11 against the surface 4a of differential piston 3 is effective to move piston 3 downwardly toward the position shown, for example, in FIGURE 1. As passage 12 is again opened an increasing ratio or proportion of inlet pressure is delivered through passage 12 to outlet 20. Thus, as indicated in FIGURE 2, the ratio beginning at predetermined level II gradually increases until, as indicated at III, the pressures at inlet 2 and outlet 20 are again equal, the differential piston 3 and valve member 13 remaining thereafter in the position shown in FIGURE 1.

When the pressure at inlet 2 drops to zero, i.e. when the vehicle operator ceases brake application, the pressure in the front axle brake cylinders (not shown), outlet 20 and chamber B is effective to raise piston 3 and member 13, closing passage 12 against valve head 14 and separating head 15 from passage 16 to exhaust chamber B, outlet 20 and the front wheel brake operating cylinders.

Thus it will be realized that the elements of the invention are responsive to varying pressure levels delivered at inlet 2 in automatic predetermined relationship to produce an initial delivery of full inlet pressure to outlet 20 at lower pressure levels, to provide a reduced ratio of inlet pressure to outlet 20 throuhgout a predetermined segment of increasing inlet pressures, a gradually increasing portion of inlet pressures thereafter and again to supply full inlet pressure at outlet 20 at the remaining higher predetermined inlet pressure levels.

The embodiments of the invention in which an exclusive property or privilege is claimed are defined as follows:

1. A valve including a housing, an inlet, an outlet, a differential piston reciprocal in said housing between said inlet and said outlet, said piston having a smaller surface presented to said inlet and a larger surface presented to said outlet, a passage through said piston communicating said inlet and outlet, a valve element positioned to control said passage, yielding means urging said differential piston toward passage-open position, and a second piston, said second piston having a surface presented to said inlet and larger than either surface of said differential piston, said second piston having a portion engageable with said differential piston to urge said differential piston toward said passage-open position in response to delivery of fluid pressure at said inlet above a predetermined level.

2. The structure of claim 1 characterized by and including an exhaust outlet and a second valve element movable with said first valve element and positioned to control said exhaust outlet.

3. The structure of claim 1 wherein said second piston includes an axial sleeve and said differential piston smaller surface is reciprocal within and in sealing engagement with the inner surface of said sleeve.

4. The structure of claim 1 characterized by and including a second yielding means stronger than said first-named yielding means and urging said second piston toward said inlet.

5. The structure of claim 2 characterized by and including a spring positioned to urge said first valve element toward a position closing said passage and said second valve element toward a position closing said exhaust outlet, said spring being of lesser force than said yielding means.

References Cited
UNITED STATES PATENTS 2,706,487    4/1955    Wilson _____ 137—102
2,764,174    9/1956    Wilson _____ 137—102

MILTON BUCHLER, Primary Examiner

J. J. McLAUGHLIN, Jr., Assistant Examiner

U.S. Cl. X.R.

137—102; 188—152